United States Patent [19]
Azimi

[11] Patent Number: 5,084,630
[45] Date of Patent: Jan. 28, 1992

[54] WAVE POWERED APPARATUS FOR GENERATING ELECTRIC POWER

[76] Inventor: Hossein Azimi, P.O. Box 781585, Wichita, Kans. 67278

[21] Appl. No.: 328,333

[22] Filed: Mar. 24, 1989

[51] Int. Cl.⁵ .............................................. F03B 13/12
[52] U.S. Cl. ...................... 290/53; 290/42; 60/503; 60/506
[58] Field of Search ............... 290/53, 42; 417/343, 417/330–337, 341; 60/398, 502, 503, 506, 497, 416

[56] References Cited

U.S. PATENT DOCUMENTS

| | | | |
|---|---|---|---|
| 4,204,406 | 5/1980 | Hopfe | 290/53 |
| 4,281,257 | 7/1981 | Testa et al. | 290/53 |
| 4,490,621 | 12/1984 | Watabe et al. | 290/42 |
| 4,560,884 | 12/1985 | Whittecar | 290/53 |
| 4,580,400 | 4/1986 | Watabe et al. | 240/53 |
| 4,843,249 | 6/1989 | Bussiese | 290/53 |

FOREIGN PATENT DOCUMENTS 8103358 11/1981 World Int. Prop. O. ............ 290/53

Primary Examiner—Mark H. Paschall
Attorney, Agent, or Firm—Rogers, Howell & Haferkamp

[57] ABSTRACT

A wave powered generator incorporating a plurality of paddle and hydraulic cylinder units. Each paddle and hydraulic cylinder unit has a paddle in the path of waves and is pivotally supported to reciprocate and operate a hydraulic pump. Each hydraulic pump discharges into an accumulator that in turn delivers fluid to an electric generator station. The accumulator automatically accommodates variations in flow rate from the hydraulic cylinder. There are provisions for accommodating variations in the height and velocity of waves, of changes in the period of the waves, and of changes in the level of the sea.

13 Claims, 4 Drawing Sheets

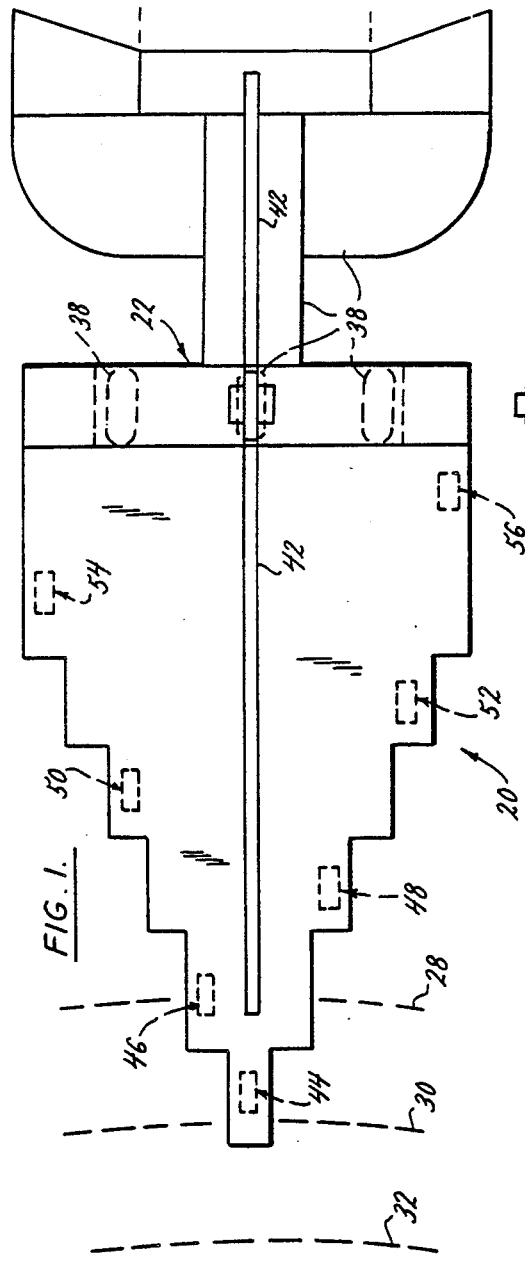
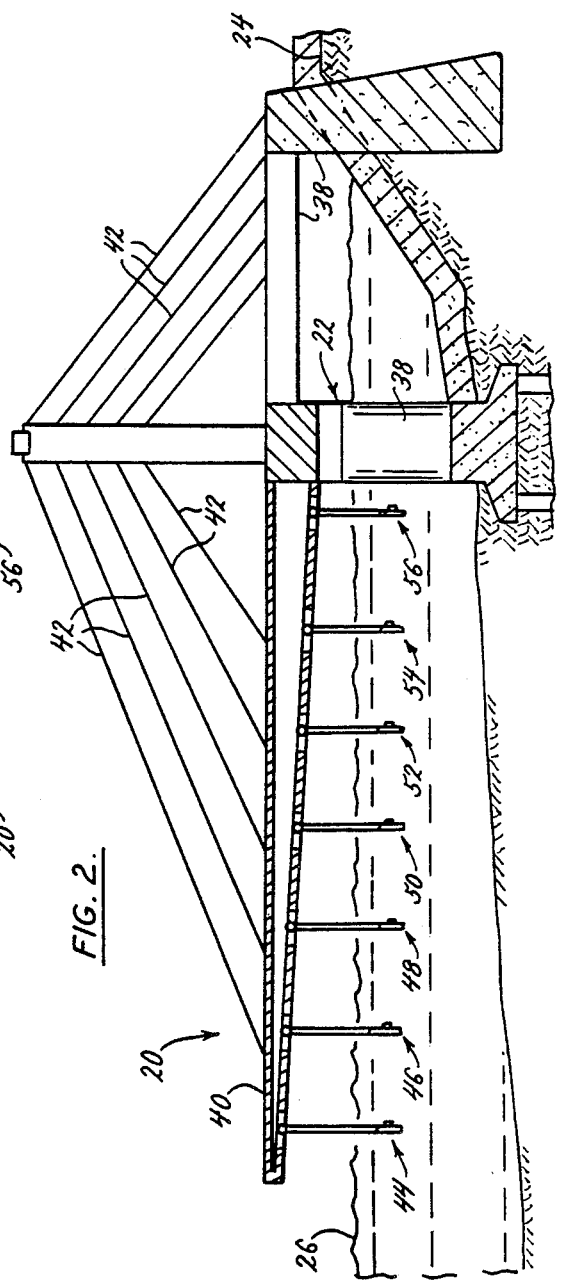

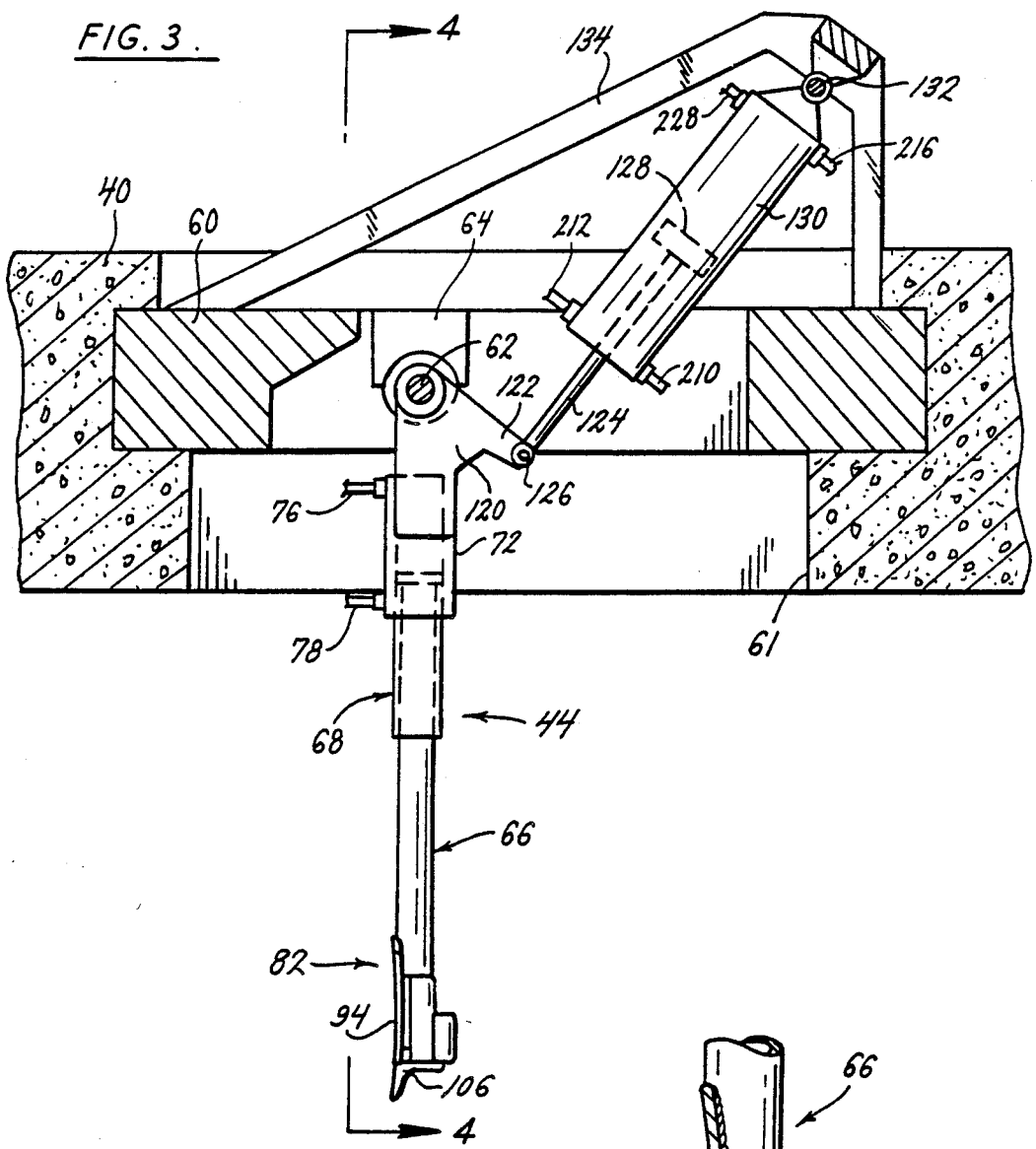
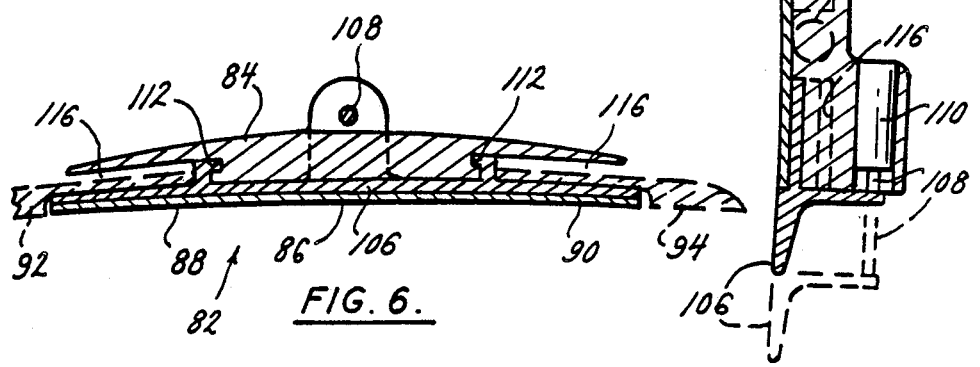

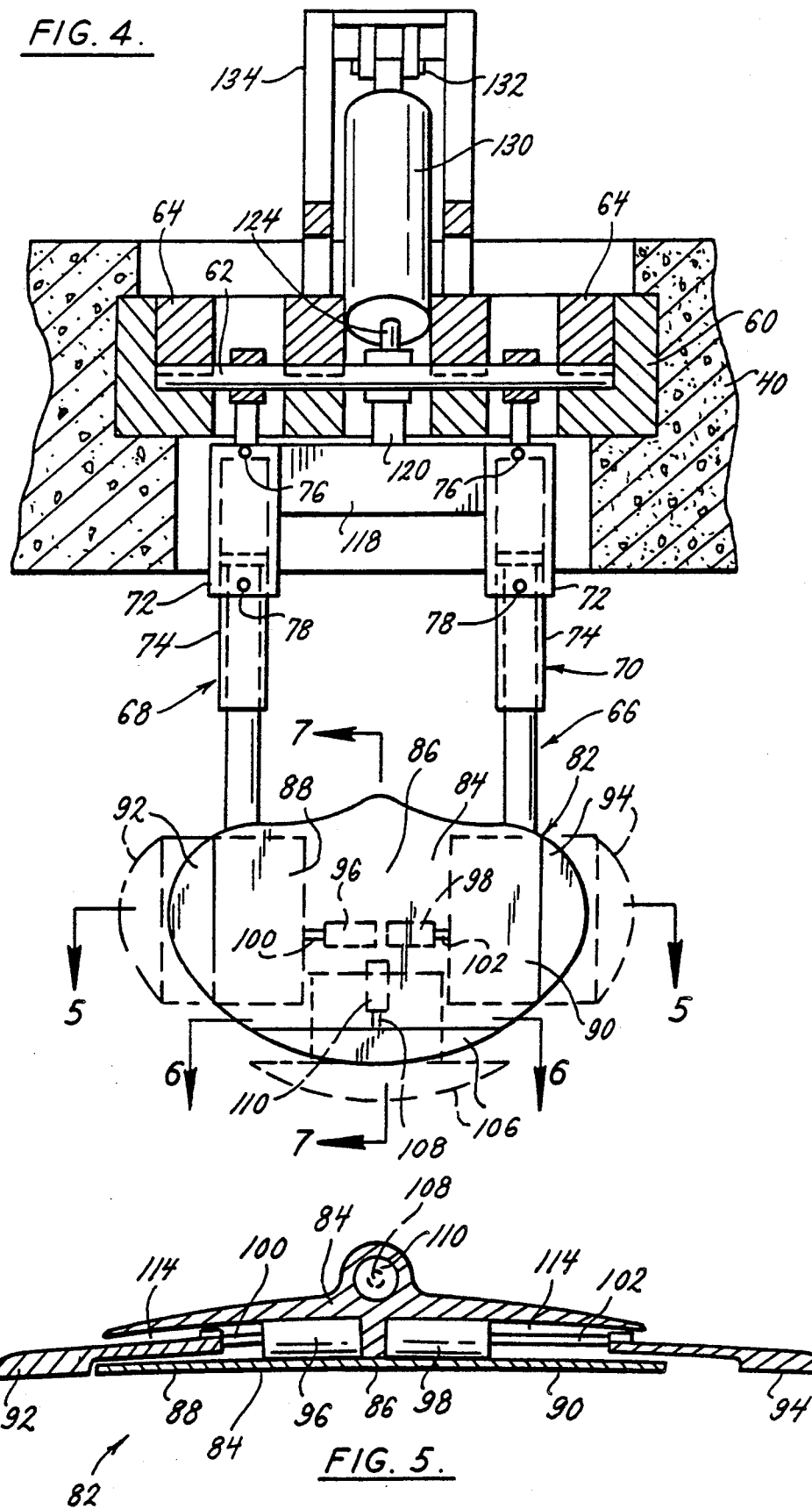

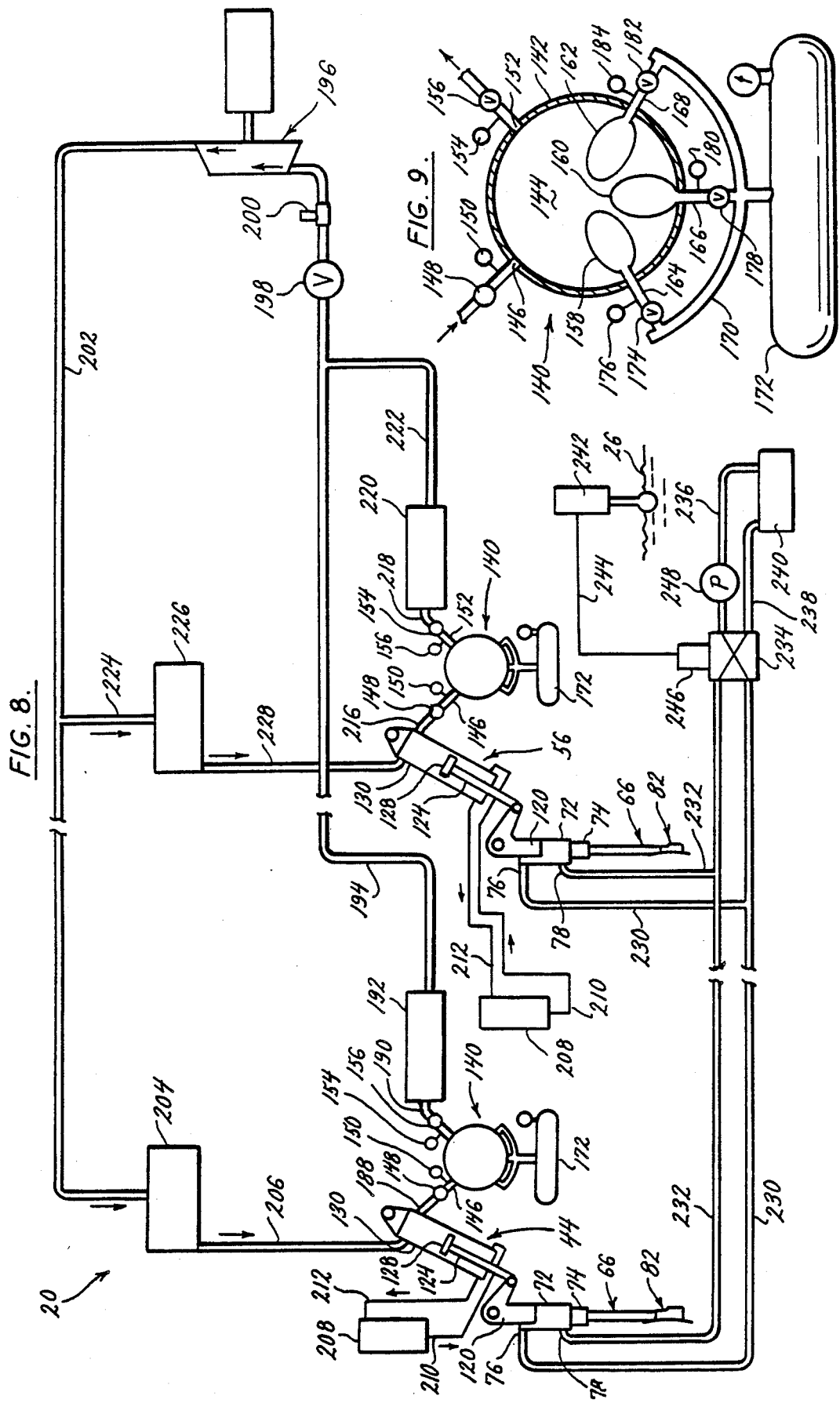

WAVE POWERED APPARATUS FOR GENERATING ELECTRIC POWER

BACKGROUND OF THE INVENTION

This invention relates to a wave powered generator system that utilizes the power of ocean waves to generate electricity. There have been many studies and monitoring programs relating to ocean waves and their characteristics such as wave height, wave period, wave direction, wave force, wave length, and so forth. There have been efforts to utilize the energy created by ocean waves as a source for generating electrical power. In the present invention, the variations in wave characteristics are taken into consideration in the design of the system such that the system will cause a relatively constant flow of hydraulic fluid to a generator station for generating electric power.

SUMMARY OF THE INVENTION

This wave powered generator system incorporates a deck supported in a cantilevered fashion from a pier structure and extending over the coastal area of a sea. The deck supports plurality of paddle and hydraulic cylinder units. Each paddle and hydraulic cylinder unit has a paddle that is pivotally mounted to swing under the force of ocean waves. Connecting arms between the paddle and its pivot incorporate hydraulic cylinders that allow the paddle to be vertically adjusted according to variations in height of the sea. In addition, the paddle has extendable wings for enlarging or reducing the effective size of the paddle in respone to variations in the height and velocity of the waves. These variations are sensed by pressure and flow rate sensors that sense the pressure and flow rate of hydraulic fluid pumped by reciprocation of the paddle.

The pumping is caused by a piston and cylinder associated with each paddle. Hydraulic fluid pumped by the piston and cylinder flows to an accumulator that incorporates a hydraulic fluid chamber with collapsible gas vessles in it. Automatic pressure and flow control valves between a pressurized gas tank and the gas vessels operate in response to variations in pressure and flow rate of hydraulic fluid entering the accumulator fluid chamber. The accumulator thus accommodates normal variations and period of the waves and delivers a steady rate of flow of hydraulic fluid from its outlet. In addition, a flow control valve on the outlet side of the accumulator opens and closes in response to variations in the rate of flow of hydraulic oil entering the accumulator chamber and an automatic pressure control valve on the outlet side of the accumulator opens and closes in response to variations in pressure sensed at the inlet side of the accumulator.

BRIEF DESCRIPTION OF THE DRAWINGS

FIG. 1 is a schematic plan view of a wave powered generator system incorporating several paddle and hydraulic cylinder units of the present invention.

FIG. 2 is a schematic side elevation view of the wave power generator system with portions shown in section.

FIG. 3 is an enlarged side elevation view of a paddle and hydraulic cylinder unit.

FIG. 4 is an elevation view taken along the plane of the line 4—4 of FIG. 3.

FIG. 5 is an enlarged view in section taken along the plane of the line 5—5 of FIG. 4.

FIG. 6 is an enlarged view in section taken along the plane of the line 6—6 of FIG. 4.

FIG. 7 is an enlarged view in section taken along the plane of the line 7—7 of FIG. 4.

FIG. 8 is a diagrammatic view of the wave powered generator system illustrating piping.

FIG. 9 is a diagrammatic view partly in section of an accumulator that is incorporated in this wave power generator.

DESCRIPTION OF THE PREFERRED EMBODIMENT

This wave power generator system 20 includes a support structure 22 that is constructed adjacent the shore 24 and out over a coastal area of an ocean 26 where there are moving ocean waves such as waves at 28, 30, and 32 that are moving to the right as viewed in FIGS. 1 and 2 toward the shore 24. The support structure 22 preferably incorporates bridge construction technology including an appropriate base and column structure 38 with a cantilever deck 40 extending above the ocean 26 from the base and column structure 38. The cantilever deck 40 may be supported in part by a suitable tension cable network 42.

The deck 40 supports a plurality of paddle and hydraulic cylinder units 44, 46, 48, 50, 52, 54, and 56. In the installation as shown in FIGS. 1 and 2, the paddle and hydraulic cylinder units 44–56 are laterally spaced from one another relative to the direction of movement of the waves so that each of the units 44–56 is in the path of wave portions that are not previously broken by other of the units 44–56. Preferably, the paddle and hydraulic cylinder units 44–56 are staggered and placed progressively outboard of the path of movement of the waves as is shown in FIG. 1. In this arrangement, the section of waves 28, 30, and 32 that is broken by the lead paddle and hydraulic cylinder unit 44 passes laterally of the unit 46 and an unbroken wave section strike the paddle and hydraulic cylinder unit 46. The same effect is established by the relative lateral placement of the remaining paddle and hydraulic cylinder units 48–56.

A typical paddle and hydraulic cylinder unit 44 is illustrated in FIGS. 3–7. As shown, the paddle and hydraulic cylinder unit 44 is supported by a base 60 that is mounted in an opening 61 through the deck 40. The base 60 supports a shaft 62 that may be held in place by an upper block 64. A paddle assembly 66 is mounted on the shaft 62. The paddle assembly 66 includes two support arms 68 and 70 that are mounted by suitable bearings on the shaft 62. Each support arm 68 and 70 incorporates a hydraulic cylinder 72 and associated piston 74 with hydraulic fluid ports 76 and 78. The legs 68 and 70 can be extended or retracted by controlling the flow of hydraulic fluid through the tubes 76 and 78 as will appear.

A paddle plate assembly 82 is mounted between the lower ends of the legs 66. The paddle plate assembly 82 includes a central plate member 84 that is slightly concave in a vertical plane as shown in FIGS. 3 and 7. As is shown in FIG. 6, the plate 84 has central portion 86 and left and right inclined sides 88 and 90 thus giving the plate a concave configuration in a horizontal plane as illustrated in FIGS. 5 and 6. There are side wings 92 and 94 supported by the plate wings 88 and 90. The side wings 92 and 94 are controlled by hydraulic cylinders 96 and 98 respectively that are supported by the plate 84 and that have piston members 100 and 102 connected to the side wings 92 and 94 respectively. Actuation of the hydraulic cylinders 96 and 98 can cause the side wings 92 and 94 to move between retracted and extended positions as shown in FIG. 5.

A bottom wing 106 is similarly connected to the piston 108 of a hydraulic cylinder 110. Actuation of the hydraulic cylinder 110 and its piston 108 will move the bottom wing 106 virtually between retracted and extended positions as illustrated in FIG. 7. The side edges of the bottom wing 106 are confined within channels 112 on the central plate 84. The side wings 92 and 94 are retained within channels defined by upper and lower angle members 114 and 116 (see FIGS. 5-7).

A plate 118 is welded between the hydraulic cylinders 72 of the leg assemblies 68 and 70. A rocker arm 120 is mounted on the shaft 62 by a suitable bearing and is welded to the plate 118. As is particularly shown in FIG. 3, the rocker arm 120 has an eccentric 122 to which a piston rod 124 is pivotally mounted by a suitable pin 126. The piston rod 124 is connected to a piston 128 that is within a hydraulic cylinder 130. The upper end of the hydraulic cylinder 130 is pivotally connected by a suitable pin 132 to an overhead frame 134 that is supported from the base frame 60. Thus, when the paddle assembly 44 pivots in a clockwise direction as viewed in FIG. 3, the piston 128 is pushed upwardly and when the paddle assembly pivots in a clockwise direction as viewed in FIG. 3, the piston 128 is drawn downwardly.

FIG. 8 is a schematic diagram of a wave powered generator system 20 illustrated as incorporating the paddle and hydraulic cylinder units 44 and 56, but it will be understood that between those units 44 and 56, the paddle and hydraulic cylinder units 46, 48, 50, 52, and 54 would also be incorporated as appropriate for a particular installation.

For each of the paddle and hydraulic cylinder units 44 through 56, there is an accumulator 140. A diagrammatic representation of the accumulator 140 is illustrated in FIG. 9. The accumulator 140 comprises a high pressure vessel 142 that defines a hydraulic fluid chamber 144. There is an inlet port 146 to the chamber 144 and upstream of the inlet port 146 there is a flow sensing device 148 and a pressure sensing device 150. An outlet port 152 also communicates with the chamber 144. Downstream of the outlet port 152, there is an automatic pressure control valve 154 and an automatic flow control valve 156.

Within the hydraulic fluid chamber 144 are a plurality of alternately expandable and contractable gas vessels 158, 160, and 162 connected by pipes 164, 166, and 168 respectively to a manifold 170 connected to a pressurized gas tank 172. There is an automatic flow control valve 174 and an automatic pressure control valve 176 in the pipe 164. Likewise, there is a flow control valve 178 and a pressure control valve 180 in the pipe 166 and a flow control valve 182 and pressure control valve 184 in the pipe 168. The flow control valves 174 are connected by suitable microelectronic circuitry (not shown) to operate in response to rates of flow sensed by the flow sensing device 148. The automatic pressure valves 176, 180, and 184 are connected by a suitable microelectronic circuitry (not shown) to operate in response to variations in pressure sensed by the pressure responsive device 150. When the rate of flow of hydraulic fluid increases as sensed by the flow sensing device 148, the flow control valves 174, 178, and 182 reduce the flow of gas to the gas vessels 158, 160, and 162 allowing them to collapse and allowing the chamber 144 to contain a greater volume of hydraulic fluid. When the rate of flow decreases, the reverse happens. When pressue of hydraulic fluid entering the accumulator increases as sensed by the pressure sensing device 150, the pressure control valves 176, 180, and 184 operate automatically to increase the pressure of the gas within the vessels 158, 160, and 162 so that the higher pressure of the hydraulic fluid will not of itself cause an increase in the volume of hydraulic fluid within the accumulator chamber 144.

Returning to FIG. 8, the cylinder 130 of the paddle and hydraulic cylinder unit 44 has a discharge side connected by a pipe 188 to the accumulator inlet port 146. The outlet port 152 is connected by a pipe 190 to a hydraulic oiler cooler 192. A pipe 194 connects the cooler 192 to an electric power generator 196. (There may be several generator 196.) Appropriately, there is at least one pressure relief valve 198 in the pipe 194 and there may be one or more fittings 200 to accommodate more than one generator 196. The outlet side of the generator 196 is connected by a pipe 202 to a hydraulic oil tank 204. A pipe 206 connects the outlet from the tank 204 to the suction side of the cylinder 130. If desired, there may be an air-vented hydraulic fluid tank 208 with inlet and outlet pipes 210 and 212 connected to the cylinder 130 as shown in FIG. 8.

Each additional paddle and hydraulic cylinder unit 46 through 56 is connected in a similar way. For example, the hydraulic cylinder 130 of the paddle and hydraulic cylinder unit 56 has a discharge pipe 216 connected to the inlet port 146 of the accumulator 140. The outlet port 152 from the accumulator is connected by a pipe 218 to a cooler 220 for cooling the hydraulic oil. The outlet from the cooler 220 is connected by a pipe 222 to the pipe 194 leading to the generator 196. From the pipe 202 on the outlet side of the generator, there is a pipe 224 leading to an oil tank 226. A pipe 228 from the oil tank 226 leads to the suction side of the cylinder 130.

As further shown in FIG. 8, the ports 76 and 78 to the cylinders 72 are connected by pipes 230 and 232 to a reversing valve 234. The reversing valve 234 is connected by pipes 236 and 238 to a hydraulic oil tank 40. A suitable sea level sensor 242 of a kind known in the art has appropriate electrical circuitry 244 to a valve control 246 that will alternately cause the valve 234 to reverse as the sensor 242 detects rising and falling of the level of the sea 26. A pump 248 and the pipe 236 pumps fluid from the oil tank 240.

Operation

In operation the various paddle and hydraulic cylinder units 44 through 56 continually intercept portions of waves such as the waves 28, 30, and 32. The crests of these waves cause the paddles to pivot to the left as viewed in FIG. 2 and when the waves pass, the troughs behind them allow the paddles to return to their normal positions which are the ones illustrated in FIG. 2. The paddle and hydraulic cylinder units can vary in number depending upon a particular installation. Likewise, the number of electrical generators 196 can vary depending upon the installation.

In normal operation, the hydraulic cylinders 130 pump hydraulic fluid through the pipe 194. Hydraulic fluid is supplied through the pipes 206 and 228 to the hydraulic cylinders 130. Variations in pressure and flow rate are compensated for by the accumulators 140. When the flow rate in the pipe 188 or the pipe 216 varies, the variation is sensed by the flow sensor 148 which controls the flow control valves 174, 178, and 182 to adjust the volume of gas and therefore the volumes of the vessels 158, 160, and 162. When the inlet pressure varies, the pressure sensor 150 controls the operation of the pressure valves 176, 180, and 184 to regulate the pressue of the gas within those vessels 158, 160, and 162.

The rate of flow in the outlet pipe 152 is further controlled by the valve 156 that operate in response to the flow control sensor 148. Pressure in the pipe 152 is controlled by the pressure valve 154 that operates in response to the pressure sensor 150.

Expansion and contraction of the effective area of the paddles has already been described. Control of the vertical portions of the paddles has also been described. The hydraulic cylinders 96, 98 and 110 (FIG. 6) operate in response to pressure and/or flow rate variations sensed by the devices 154 and 156.

In summary, the valve 234 is reversed in response to variations in height of the level of the sea 26 as sensed by the device 242. Reversals of the valve 234 cause fluid from the pump 248 to flow alternately through the pipes 230 or 232 to actuate the cylinders 72.

While the present invention has been described by reference to a specific embodiment, it should be understood that modifications, and variations of the invention may be constructed without departing from the scope of the invention defined in the following claims.

What is claimed is:

1. A wave powered generator system comprising:
a plurality of plates;
means for pivotally supporting the plurality of plates in a path of waves progressing through a body of water, the means supporting the plurality of plates in both a laterally spaced relationship across the path of the waves, and in a longitudinally spaced relationship into the path of the waves;
power generating means;
fluid conduit means connected for operation of the power generating means upon circulation of fluid through the fluid conduit means;
a plurality of pumps in the fluid conduit means;
means operatively connecting the plurality of plates with the plurality of pumps for causing the plurality of pumps to circulate fluid through the fluid conduit means in response to pivotal movement of the plurality of plates; and
fluid accumulator means in the fluid conduit means between the plurality of pumps and the power generating means for maintaining steady fluid flow conditions through the fluid conduit means.

2. The wave powered generating system of claim 1, wherein:
the means for pivotally supporting the plurality of plates includes a cantilevered deck elevated over the path of the waves.

3. The wave powered generating system of claim 1, wherein:
one plate of the plurality of plates is positioned in the path of the waves forward relative to other plates of the plurality of plates, and the one plate is also positioned laterally centered relative to the other plates of the plurality of plates.

4. A wave powered generating system comprising:
a base;
support arm means pivotally mounted to the base for oscillating movement of the support arm means about the pivot mounting to the base, the support arm means extending in a direction from the base into a path of waves in a body of water;
plate means mounted on the support arm means for movement on the support arm means toward and away from the base in response to changes in a level of the body of water;
power generating means;
fluid conduit means operatively connected with the power generating means for operation of the power generating means upon circulation of fluid through the fluid conduit means,
piston actuated pump means operatively connected with the fluid conduit means and the plate means for circulating fluid through the fluid conduit means in response to oscillating movement of the plate means on the support arm means; and
accumulator means operatively connected with the fluid conduit means for maintaining steady fluid flow conditions in the fluid conduit means.

5. The wave powered generating system of claim 4, including:
means for varying a rate of fluid circulation in the fluid conduit means in inverse proportion to variations in the oscillating movement of the support arm means to thereby maintain substantially constant the rate of fluid circulation in the fluid conduit means.

6. The wave powered generating system of claim 5, wherein:
the means for varying the rate of fluid circulation includes a flow control valve controlling fluid flow from the accumulator means in response to the oscillating movement of the support arm means.

7. The wave powered generating system of claim 4, wherein:
the accumulator means includes a pressure vessel enclosing a fluid chamber having an inlet for receiving fluid from the fluid conduit means and an outlet for discharging fluid to the fluid conduit means, and a volume control means for adjusting the volume of the fluid chamber in response to variations in a volume rate of fluid flow through the inlet.

8. The wave powered generating system of claim 7, wherein:
the volume control means includes a flexible means defining a gas chamber within the fluid chamber, a source of pressurized gas, and tube means connected between the source of gas and the gas chamber.

9. The wave powered generating system of claim 8 including:
valve means in the tube means responsive to variations in the rate of fluid flow through the inlet for varying a flow of gas from the source of gas to the gas chamber.

10. The wave powered generating system of claim 8 including:
valve means in the tube means responsive to variations in the pressure of fluid flow through the inlet for varying a pressure of gas in the gas chamber.

11. The wave powered generating system of claim 4, wherein:
the plate means includes a plurality of plates and the pump means includes a plurality of pumps.

12. The wave powered generating system of claim 11, wherein:

the plurality of plates are spaced laterally from one another relative to the direction of movement of the waves.

13. The wave powered generating system of claim 4, wherein:
the base includes a deck and a pier means for supporting the deck in a cantilevered fashion above the waves.

* * * * *